US006686880B1

(12) United States Patent
Marko et al.

(10) Patent No.: US 6,686,880 B1
(45) Date of Patent: Feb. 3, 2004

(54) METHOD AND APPARATUS FOR PROMPTING A REVERSE CHANNEL RESPONSE FROM RECEIVER IN A DIGITAL BROADCAST SYSTEM

(75) Inventors: Paul D. Marko, Pembroke Pines, FL (US); Craig P. Wadin, Sunrise, FL (US)

(73) Assignee: XM Satellite Radio, Inc., Washington, DC (US)

( * ) Notice: Subject to any disclaimer, the term of this patent is extended or adjusted under 35 U.S.C. 154(b) by 219 days.

(21) Appl. No.: 09/695,315

(22) Filed: Oct. 25, 2000

(51) Int. Cl.[7] .................................................. G01S 3/02

(52) U.S. Cl. ...................... 342/457; 455/425; 455/11.1; 455/575.7; 342/457; 342/357.07; 342/352; 370/316; 370/310; 713/168; 386/83

(58) Field of Search ........................... 342/457, 357.07, 342/352; 370/316, 310; 455/13.1, 13.2, 425; 386/83; 713/168

(56) References Cited

U.S. PATENT DOCUMENTS

| | | | | | |
|---|---|---|---|---|---|
| 5,216,427 | A | * | 6/1993 | Yan et al. | 342/352 |
| 5,455,823 | A | | 10/1995 | Noreen et al. | 370/50 |
| 5,490,284 | A | | 2/1996 | Itoh et al. | 455/11.1 |
| 5,777,580 | A | * | 7/1998 | Janky et al. | 342/457 |
| 5,828,951 | A | | 10/1998 | Suemitsu | 455/89 |
| 6,028,537 | A | | 2/2000 | Suman et al. | 340/988 |
| 6,076,099 | A | | 6/2000 | Chen et al. | 709/202 |
| 6,154,206 | A | * | 11/2000 | Ludtke | 713/168 |
| 6,173,112 | B1 | * | 1/2001 | Gruse et al. | 386/83 |
| 6,278,861 | B1 | * | 8/2001 | Ward et al. | 455/13.1 |
| 6,411,806 | B1 | * | 6/2002 | Garner et al. | 455/428 |
| 6,477,152 | B1 | * | 11/2002 | Hiett | 370/316 |

* cited by examiner

*Primary Examiner*—Sinh Tran
*Assistant Examiner*—David Q Nguyen
(74) *Attorney, Agent, or Firm*—Roylance, Abrams, Berdo & Goodman, LLP

(57) ABSTRACT

The invention relates generally to a digital broadcast system and receivers therein which are configured to allow the use of a reverse channel for transmitting responses to broadcast messages. The digital broadcast system is configured to receive requests for information from a mobile platform device (e.g., a GPS receiver) and broadcast information request messages. The receivers are configured to receive a broadcast information request message and communicate with a telematics-enabled device in a mobile platform such as a cellular telephone to initiate a transmission of a response message therefrom.

17 Claims, 5 Drawing Sheets

METHOD AND APPARATUS FOR PROMPTING A REVERSE CHANNEL RESPONSE FROM RECEIVER IN A DIGITAL BROADCAST SYSTEM

CROSS REFERENCE TO RELATED APPLICATIONS

Related subject matter is disclosed and claimed in co-pending U.S. patent application Ser. No. 09/695,226 of Paul D. Marko et al filed even date herewith for "Method and Apparatus for Employing Stored Content at Receivers to Improve Efficiency of Broadcast System Bandwidth Use"; in co-pending U.S. patent application Ser. No. 09/695,081 of Paul D. Marko et al filed even date herewith for "Method and Apparatus for Controlling User Access and Decryption of Locally Stored Content at Receivers in a Digital Broadcast System"; co-pending U.S. patent application Ser. No. 09/695,228 of Paul D. Marko et al filed even date herewith for "Method and Apparatus for Implementing File Transfers to Receivers in a Digital Broadcast System"; in co-pending U.S. patent application Ser. No. 09/695,139 of Paul D. Marko et al filed even date herewith for "Method and Apparatus for Providing On-Demand Access of Stored Content at a Receiver in a Digital Broadcast System"; in co-pending U.S. patent application Ser. No. 09/388,926, filed by Hien D. Ma et al on Nov. 4, 1999; and in co-pending U.S. patent application Ser. No. 09/433,862, filed by Paul D. Marko et al on Nov. 4, 1999; all of said applications being expressly incorporated herein by reference.

FIELD OF THE INVENTION

The invention relates generally to an apparatus and method for prompting receivers in a digital broadcast system to generate a response via a reverse channel on a second digital transmission system.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers (i.e., with a receiver antenna pointed for optimal line of sight (LOS) reception from a satellite) or mobile receivers (e.g., a receiver that is hand-carried by a user or is mounted in a vehicle).

A digital broadcast system such as an SDARS system is advantageous for its cost-effectiveness in providing the same content to a plurality of receivers. A receiver in a digital broadcast system, however, is somewhat limited in operation in that it cannot transmit signals. While a two-way communication system provides terminal-to-terminal communication (Le., each device has a receive and a transmit capability), it is not cost-effective to deliver the same content or message to these terminals via separate call connections. For example, an operator of a fleet of vehicles may wish to have each vehicle transmit its mileage to the fleet operator. While a broadcast message to request a response regarding mileage can be transmitted relatively inexpensively to each vehicle in the fleet via a broadcast system, receivers in the broadcast system have no means with which to respond with a message relating to current mileage on the vehicle. Further, it is preferable to not waste the revenue generating bandwidth of a secondary system such as a cellular telephone system with the same message request repeated over multiple call connections.

Accordingly, a need exists for receivers which can receive broadcast signals from a satellite and/or terrestrial-based digital broadcast system that provides SDARS, for example, but which also have a transmit capability. Accordingly, a need exists for a digital broadcast system receiver, which can operate in conjunction with a second communication system such as a cellular telecommunications system. For example, it would be advantageous to equip a vehicle with an SDARS receiver for one-way broadcast reception of audio programs, maps, weather and travel advisory information, among other content, and a mobile telephone for two-way communication.

SUMMARY OF THE INVENTION

In accordance with the present invention, the above-described advantages are realized by a receiver configured to receive broadcast signals from a digital broadcast system, and to transmit signals via a second communication system that provides the receiver with a reverse channel communication path.

In accordance with another aspect of the present invention, a broadcast station transmits a message to one or more selected receivers instructing the receivers to generate and transmit a response to another device or system via a communication system having a transmit capability.

In accordance with yet another aspect of the present invention, a receiver comprises a system controller that is configured to convert a response to a broadcast message into a signal for transmission to a device having a transmit capability (e.g., a cellular telephone, a pager, a facsimile machine, and so on).

In accordance with still yet another aspect of the present invention, the system controller communicates with telematics-enabled devices such as devices with a transmit capability via an in-vehicle communication bus connected to a vehicle network hub.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
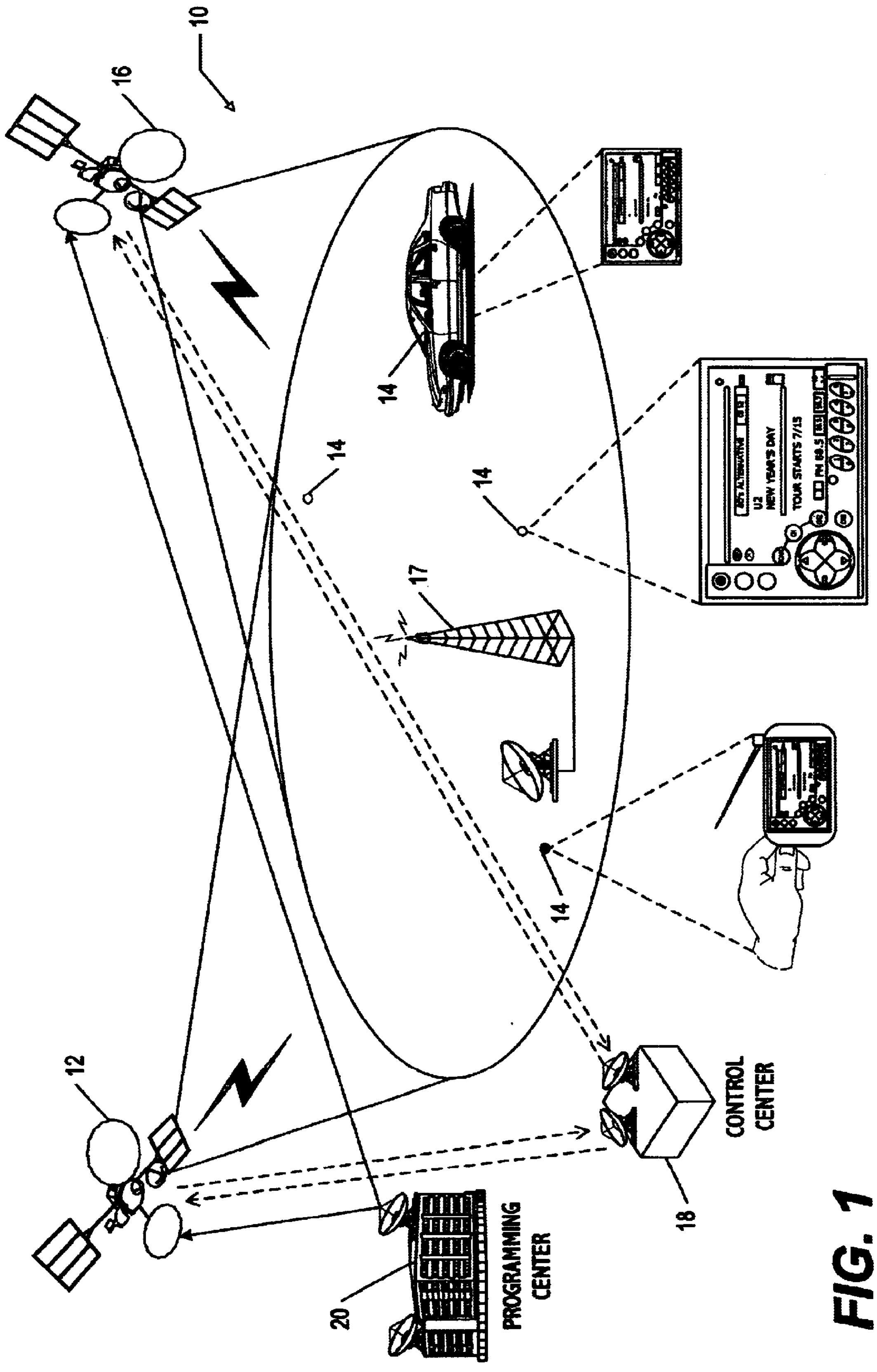
FIG. 1 illustrates an SDARS system constructed in accordance with an embodiment of the present invention.

FIG. 1 depicts a satellite broadcast system 10, which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits can be used. Alternatively, a broadcast signal can be sent using only a terrestrial transmission system.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national political, financial and sports). The SDARS can also provide emergency information, travel advisory information, educational programs, and the like.

The types of content to be provided in a payload channel is determined manually or automatically via a computer, based on contractual and financial arrangements with information providers, and demographic and financial decisions determining the types of programming to be provided via the program center 20. In addition, a payload channel 30 can comprise plural service components to provide a plurality of different services. For example, a number of service components in a payload channel can be related to the same service and can include an audio component and a video and/or a digital data stream comprising auxiliary information, or another audio component to insert advertising information relating to the audio or video program In accordance with the present invention, the revenue-generating ability of a broadcast system is enhanced by allowing the broadcast system 10 to transmit messages requesting information from a mobile platform. The receivers 14 are configured in accordance with the present invention to operate with other devices on the mobile platform to obtain the requested information and to transmit the information via another communication system such as a cellular telephone system.

Figure 2:
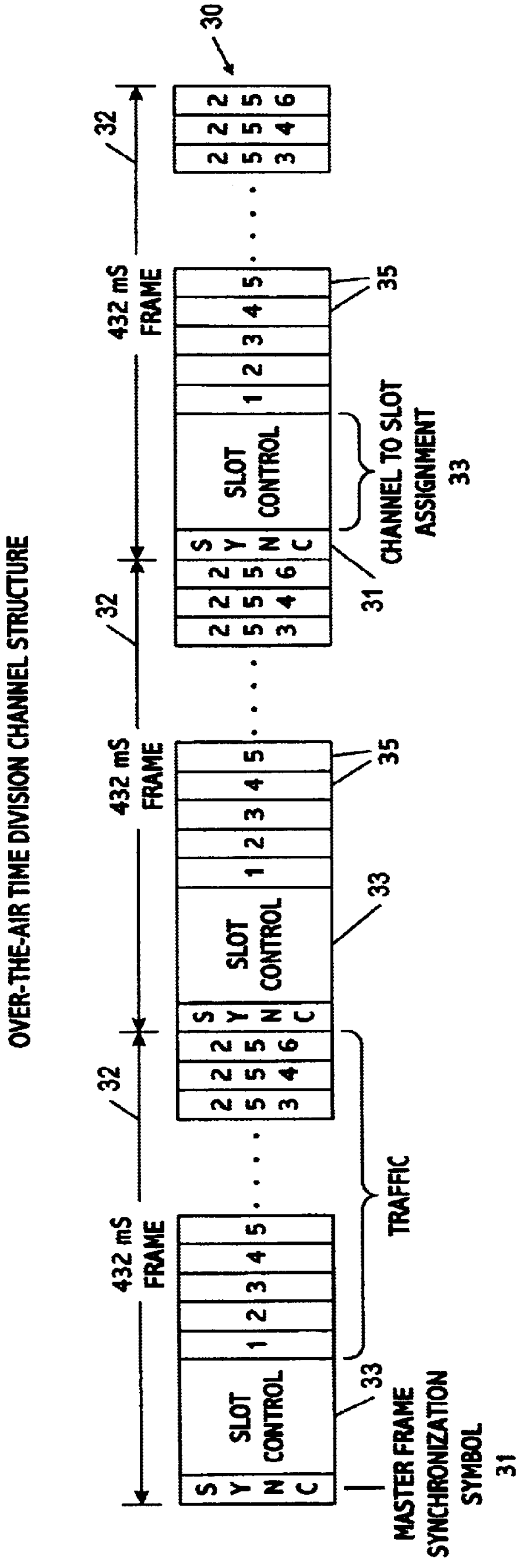
FIG. 2 illustrates an exemplary radio broadcast transmission.

An exemplary composite data stream 30 is illustrated in FIG. 2. The system 10 can broadcast a composite data stream 30 generated, for example, by time division multiplexing a plurality of broadcast channels, along with other data such as overhead data. In the illustrated example, the composite data stream 30 comprises frames 32. Each of the frames 32 is provided with a master frame synchronization symbol 31, a slot control field 33 and a plurality of time slots 35 for transporting traffic channels (e.g., 256 time slots per frame). The slot control field 33 comprises overhead data such as channel-to-slot assignment data. The receivers are therefore configured to demultiplex a received composite data stream using the synchronization symbols and the slot control field data to playback a selected one of the broadcast channels.

In accordance with the present invention, the composite data stream 30 can also be used to transmit messages in the broadcast channels which are directed to one or more receivers 14 and which request a response from the receiver(s). For example, a vehicle manufacturer may want responses from vehicles having a selected model and year of manufacture indicating mileage and other data relating to the vehicle. A fleet operator may want to know where vehicles in the fleet are presently located for distribution and transportation planning purposes, or for security and theft recovery purposes. Conventional receivers in a digital broadcast system are not configured to respond to such a message request because they have no back haul communication link to the fleet operator, among others.

Figure 3:
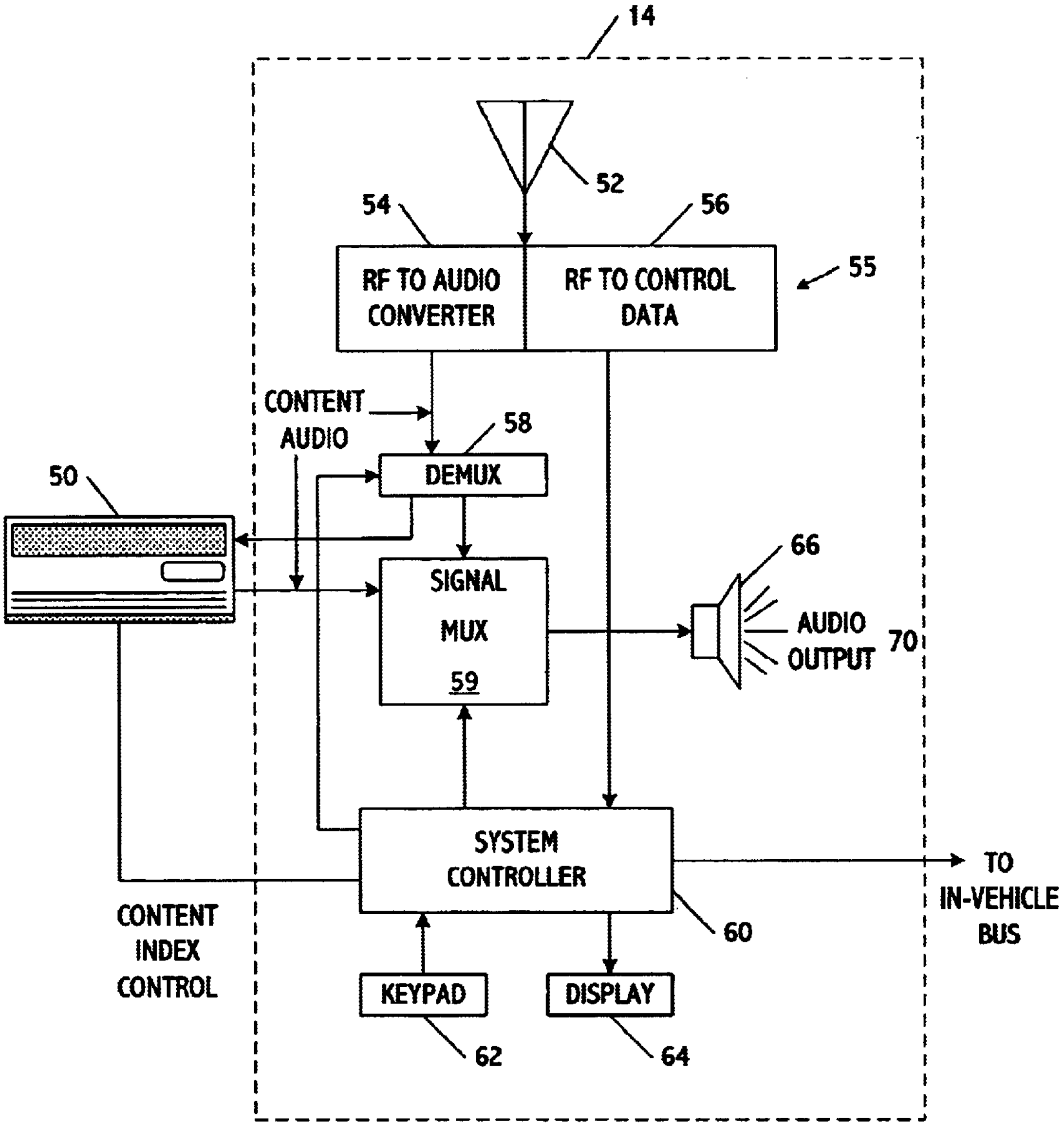
FIG. 3 is a block diagram of a receiver constructed in accordance with an embodiment of the present invention.

The messages in the transmitted data stream 30 can be provided with headers that specify which receiver(s) are to receive the message. Receivers 14 are preferably constructed as depicted in FIG. 3. The receiver 14 can be provided with a local storage device 50 for storing at least one identification code that is found in the headers of messages directed to that receiver. The local storage device 50 can be any memory device that can store information in a digital format and can include, but is not limited to, a floppy disc, a hard disk, a compact disc (CD), a digital video disc (DVD), an optical disc, random access memory (RAM), a FLASH memory, a disk pack, digital audio tape (DAT), or other medium for storage and retrieval of digital information. The local storage device 50 can be provided within a receiver 14 chassis or connected externally thereto.

With continued reference to FIG. 3, the receiver 14 comprises an antenna 52 for receiving a broadcast signal from at least one of the satellites 12 and 16 and/or a terrestrial repeater 17. As stated previously, the broadcast signal can also originate from only a terrestrial transmission system. A converter 55 is preferably provided which is operable to perform radio frequency (RF) downconversion, and any demodulation, synchronization, demultiplexing, de-interleaving and decoding functions performed as part of the transport layer at a broadcast station in the system 10, and described in the afore-mentioned application Ser. No. 09/433,862, to obtain the baseband broadcast channels from the broadcast composite data stream. The receiver 14 comprises a system controller 60 connected to a display 64 and keypad 62 to allow a user to select a broadcast channel, among other operations. In response to the user program channel selection, the controller 60 provides control signals to a demultiplexer 58 to select the corresponding broadcast channel for output via a loudspeaker 66 or other output device (e.g., a display or monitor).

As shown in FIG. 3, the converter 55 comprises an RF-to-audio converter 54 and an RF-to-control data converter 56 to extract, respectively, the traffic (e.g., an audio program or message) and control data (e.g., headers) from the received signal The traffic such as a selected audio program is preferably provided to the output device 66 via a signal multiplexer 59 as soon as the content thereof is received and processed via the converter 55 and demultiplexer 58. Traffic such as a message intended for that receiver is provided to the system controller 60 or the local storage device 50.

In accordance with the present invention, the converter 55 removes headers from the received data stream and determines from the headers whether the content (e.g., a message) is intended for that receiver 14. By way of an example, headers of broadcast messages to receivers can include broadcast identification codes or broadcast IDs. The broadcast IDs can indicate whether a message is intended for a selected receiver, or for one or more groups in which the receiver is included (e.g., model/year of car owned by user or in which receiver is used, users of selected products and/or services, and the like), or for all receivers. For example, a group broadcast ID can be assigned to a fleet of vehicles such as cars belonging to a car rental agency or a car manufacturer. A car manufacturer can use the file transfer operation of the present invention to send car owners maintenance reminders and advertisements for specials on car services. The system controller 60 or the converter 55 stores selected broadcast IDs and uses the stored IDs to determine which received content to discard and which received content to capture.

Figure 4:
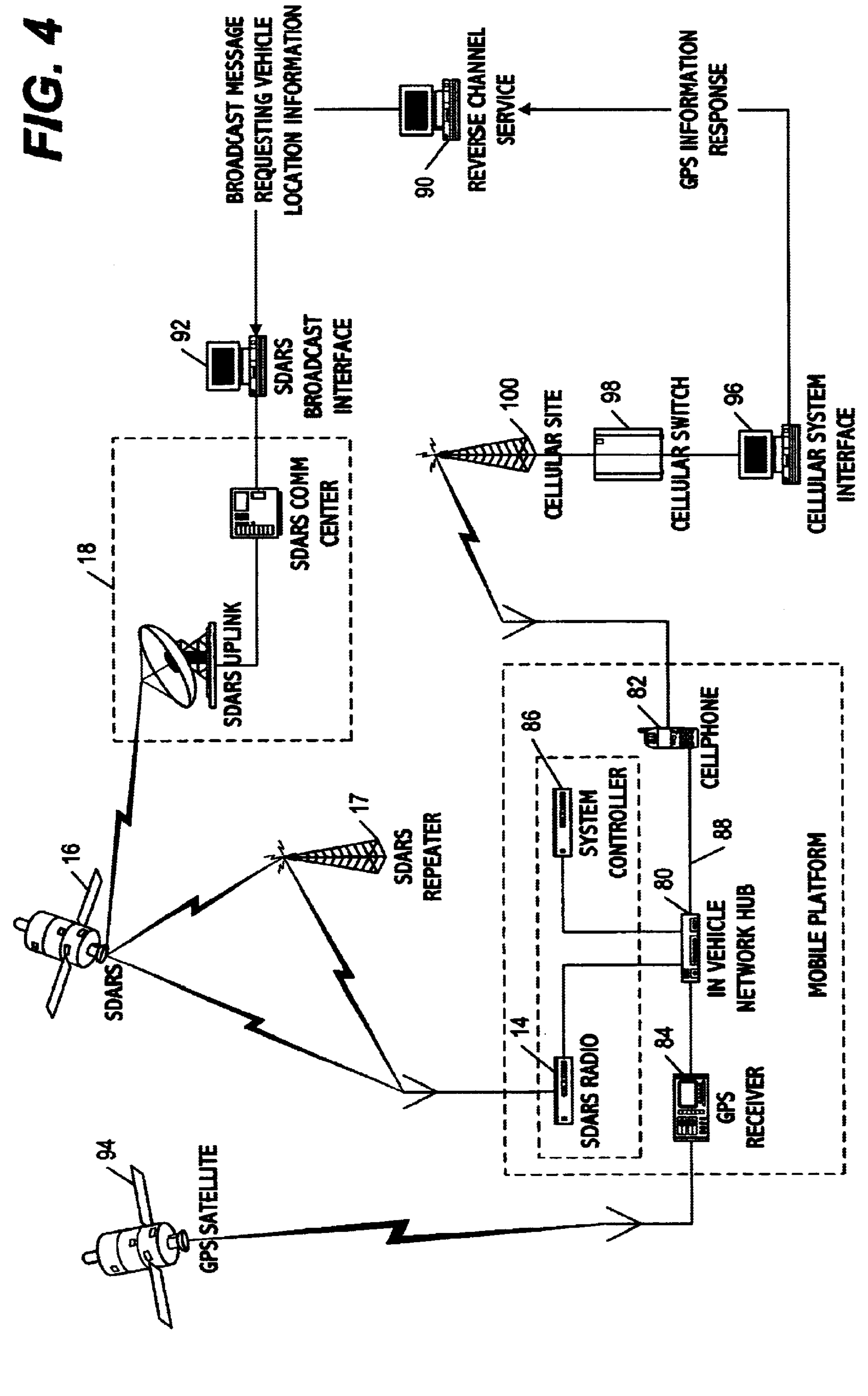
FIG. 4 illustrates an SDARS system in which receivers are provided with a transmit function via another communications system in accordance with an embodiment of the present invention.

With reference to FIGS. 3 and 4, the system controller 60 of the receiver 14 is preferably in communication with an in-vehicle network hub 80 that controls communication between telematics-enabled devices in the vehicle such as a cellular telephone 82, a GPS receiver 84, and a system controller 86, among other devices (not shown) such as a pager, a facsimile machine, the controller the vehicle engine and other electronically controlled vehicle devices, and the like. An in-vehicle communication bus indicated generally at 88 can be a hardware bus or a wireless bus (e.g., using Blue Tooth signaling). The system controller 86 is configured to convert signals exchanged between the telematics-enabled devices into a format that is understood by the receiving device.

For example, a broadcast message can be sent to the receiver 14 via the SDARS system 10 to instruct that receiver to send a response message relating to mileage of the vehicle to a fleet manager. In addition to a broadcast ID, a header associated with the message can have auxiliary data such as the address or identification code of a destination device for the message (e.g., the GPS receiver 84). The system controller 60 provides a signal relating to the received broadcast message to the hub 80 which directs a signal relating to the message to the system controller 86. The system controller 86 can then obtain the requested mileage data (e.g., from the engine controller) and provide the data to a transmitting device such as a pager or a cellular telephone via the hub 80. The transmitting device, in turn, sends the requested information to the fleet manager. The auxiliary data can also be used to instruct the receiver 14 to not initiate a response signal instantaneously. In this manner, the receivers in the fleet of vehicles will not all respond at the same time and overburden the transmitting network or the fleet manager with responses.

Figure 5:
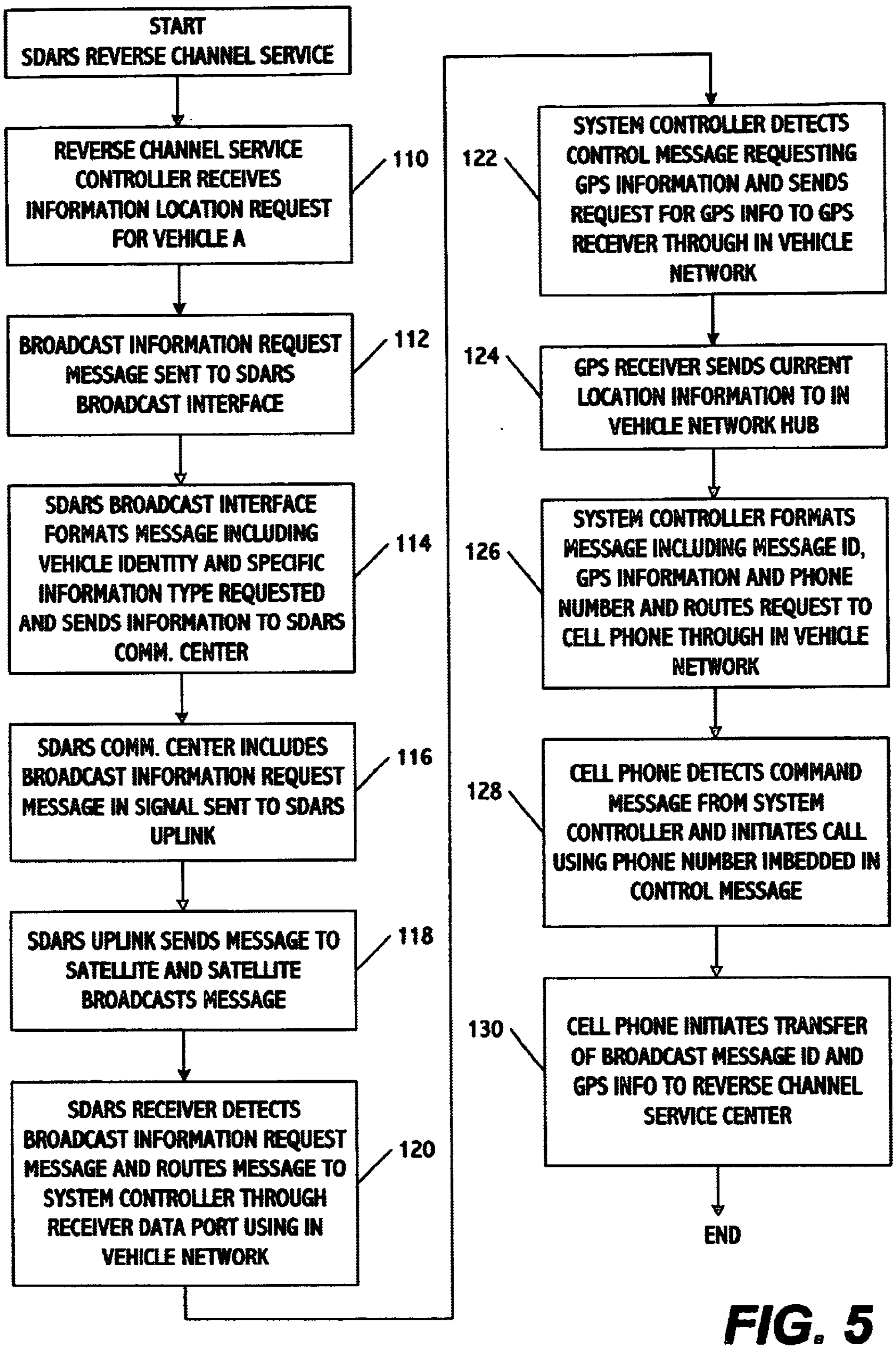
FIG. 5 is a flow chart depicting a sequence of operations for using a secondary communications system in an SDARS system for transmission from the receivers in accordance with an embodiment of the present invention.

FIGS. 4 and 5 illustrate another example of implementing SDARS reverse channel service in accordance with the present invention. The requested service is a response message from one or a fleet of vehicles indicating vehicle location. A response from one vehicle is described with reference to FIGS. 4 and 5. A reverse channel service controller 90 receives an information location request from a fleet manager (not shown), for example (step 110). The reverse channel service controller 90 provides the request to an SDARS broadcast interface 92 connected to the SDARS control center 18 (step 112). The request is associated with a broadcast message identification code or broadcast message ID, which is provided in the message broadcast via the SDARS system 10 and in the response message generated by the responding device to allow the reverse channel service controller to associate the requested data, once it is received, with the request therefor. The SDARS broadcast interface 92 formats a message, including vehicle or receiver identity, the type of information requested, and the broadcast message ID, and provides the message to the SDARS control center 18 (step 114). The control center 18 provides a message corresponding to the information location request into the composite data stream 30 for broadcast via a satellite 12 and/or satellite 16 or repeater 17 (steps 116 and 118).

With continued reference to FIGS. 4 and 5, the receivers 14 in the SDARS system 10 receive the composite data stream 30 comprising the message. The receiver in the illustrated example, to which the message is addressed, detects the broadcast information request message using the converter 55 or system controller 60 as described above in connection with FIG. 3. The receiver 14 then routes the message to the system controller 86 using the in-vehicle network (e.g., the bus 88 and the hub 80) (step 120). The system controller 86 detects the control message requesting GPS information and sends the request for GPS information to the GPS receiver 84 via the in-vehicle network (step 122).

The GPS receiver 84 provides current vehicle location information to the system controller 86 via the in-vehicle network (step 124). The system controller 86, in turn, formats a response message including the broadcast message ID, the requested GPS information and the telephone number of the entity requesting the information, and routes the response message to the cellular telephone 82 via the in-vehicle network (step 126). The cellular telephone 82 detects the response message and initiates a call using the number provided therein (step 128). Accordingly, the cellular telephone initiates transfer of the broadcast message ID and requested GPS information to the reverse channel service center 90 via the cellular communications network (i.e., the cellular site tower 100, the cellular switch 98 and the cellular system interface 96) (step 130).

The present invention is advantageous because it uses cost-effective broadcast transmission, but also allows for additional revenue-generating signaling via a reverse channel. The SDARS system can therefore generate revenue not only from subscriptions to broadcast service and payment for broadcast advertisement and programming, but also from commercial entities (e.g., fleet operators, automotive manufacturers, among others) interested in using the reverse channel operations of the present invention.

Although the present invention has been described with reference to a preferred embodiment thereof, it will be understood that the invention is not limited to the details thereof. Various modifications and substitutions will occur to those of ordinary skill in the art All such substitutions are intended to be embraced within the scope of the invention as defined in the appended claims.

What is claimed is:

1. A method of providing a response channel from a mobile platform in a digital broadcast system comprising:

generating a message comprising a request for information from a mobile platform device and identification of at least a selected one of receivers in said digital broadcast system, said digital broadcast system being operable to transmit a broadcast data stream comprising a plurality of programs, said receivers being operable to playback a selected one of said programs;

transmitting said message via said digital broadcast system by inserting said message into said broadcast data stream;

receiving said message at said receivers in said digital broadcast system;

generating a command signal at said selected receiver in response to said message;

providing said command signal to a network on said mobile platform;

transmitting said command signal to said mobile platform device via said network;

generating a response signal from said mobile platform device comprising said information; and transmitting said response signal via a communication system different from said digital broadcast system.

2. A method as claimed in claim 1, wherein said generating step for generating a message comprises the step of providing a broadcast message identifier in said message, and said generating step for generating a response signal comprises the step of providing said broadcast message identifier in said response signal.

3. A method as claimed in claim 1, wherein said mobile platform device is selected from the group consisting of a cellular telephone, a GPS receiver, a position location device, a pager, a facsimile machine, a vehicle engine controller.

4. A method as claimed in claim 1, wherein said response signal is sent via said network to a communication device operable to transmit signals using said communication system.

5. A method as claimed in claim 3, wherein said mobile platform is a vehicle, said network is a telematics bus deployed in said vehicle, and said receiver can communicate with said mobile platform device via said telematics bus.

6. A method as claimed in claim 1, wherein said message comprises a control signal to instruct said mobile platform device to delay transmission of said response signal a selected amount of time.

7. A method as claimed in claim 1, wherein said message comprises a destination identifier corresponding to said mobile platform device.

8. A method as claimed in claim 1, wherein said message can be provided with data to designate a selected group of said receivers, said receivers being operable to examine said data after said message is received to determine if said message is directed thereto, said receivers generating said command signal when said message is directed to them.

9. A method as claimed in claim 8, wherein said selected group of receivers corresponds to a fleet of vehicles, said message being a fleet message selected from the group consisting of a request for mileage, a reminder for vehicle service, a request for vehicle location, a request for a response from a vehicle having at least one of a selected model and year of manufacture, and a request for selected data from said vehicle.

10. A method as claimed in claim 1, wherein said message comprises data relating to a system ordering said request.

11. A method as claimed in claim 1, wherein said message comprises a telephone number of a system ordering said request, said communication system being operable to use said telephone number to provide said information to said system.

12. A method of providing a response channel from a mobile platform in a digital broadcast system, the digital broadcast system being operable to transmit a broadcast data stream comprising a plurality of program channels to receivers, the receivers being configured for reception-only operation to playback a selected one of the programs, the method comprising the steps of:

receiving said broadcast data stream at one of said receivers, said broadcast data stream comprising at least one message, said message comprising a request for information from a mobile platform device connected to a selected one of said receivers via at least one of a wireless link and a wireline link, and identification of the selected said receiver;

determining if said identification in said message corresponds to said one of said receivers;

generating a command signal at said one of said receivers in response to said message if said identification in said message corresponds thereto;

transmitting said command signal to said mobile platform device via said at least one of a wireless link and a wireline link;

generating a response signal from said mobile platform device comprising said information; and transmitting said response signal via a communication system different from said digital broadcast system.

13. A method as claimed in claim 12, wherein said message can be provided with data to designate a selected one or a selected group of said receivers, and further comprising the steps of:

examining said data at said one of said receivers after said message is received to determine if said message is directed thereto; and generating said command signal when said message is directed to said one of said receivers.

14. A method as claimed in claim 13, further comprising the step of storing a plurality of identifiers at said one of said receivers corresponding to respective ones of said groups of said receivers to which said one of said receivers belongs, said examining step further comprising the step of comparing said data to said plurality of identifiers.

15. A method as claimed in claim 12, wherein receiver comprises a controller, said controller being operable to communicate with said mobile platform device via said at least one of a wireless link and a wireline link and to generate said command signal.

16. A method as claimed in claim 15, wherein said receiving step comprises the steps of:

performing at least one of a group of operations consisting of downconverting, demodulating, synchronizing, demultiplexing, deinterleaving and decoding on the received said broadcast data stream to extract and playback a selected one of said plurality of programs and to locate said message;

providing said message to said controller; and further comprising the step of controlling generation and transmission of said command signal to said mobile platform device using said controller.

17. A method as claimed in claim 16, wherein said controlling step comprises the steps of formatting said command signal using a format compatible with said mobile platform device.

* * * * *